(12) United States Patent
Nagata et al.

(10) Patent No.: US 7,978,377 B2
(45) Date of Patent: Jul. 12, 2011

(54) IMAGE PLAYBACK METHOD, IMAGE PLAYBACK APPARATUS, AND IMAGE PLAYBACK PROGRAM

(75) Inventors: Hideki Nagata, Hachioji (JP); Nobuyuki Watanabe, Yokohama (JP); Minoru Omaki, Kunitachi (JP)

(73) Assignee: Olympus Corporation, Tokyo (JP)

( * ) Notice: Subject to any disclaimer, the term of this patent is extended or adjusted under 35 U.S.C. 154(b) by 965 days.

(21) Appl. No.: 11/901,828

(22) Filed: Sep. 18, 2007

(65) Prior Publication Data
US 2008/0084586 A1 Apr. 10, 2008

(30) Foreign Application Priority Data
Sep. 25, 2006 (JP) ................................ 2006-258716

(51) Int. Cl.
*H04N 1/04* (2006.01)
(52) U.S. Cl. ......... 358/448; 358/461; 358/505; 358/518
(58) Field of Classification Search .................. 358/448, 358/461, 505, 518, 520, 521
See application file for complete search history.

(56) References Cited

U.S. PATENT DOCUMENTS

| 6,313,477 B1 * | 11/2001 | Yasuda et al. ................. 250/587 |
| 2003/0081954 A1 | 5/2003 | Niikawa et al. |
| 2006/0007501 A1 | 1/2006 | Kawada |

FOREIGN PATENT DOCUMENTS

| JP | 2003-134520 | 5/2003 |
| JP | 2004-336386 | 11/2004 |
| JP | 2006-25007 | 1/2006 |

* cited by examiner

*Primary Examiner* — Houshang Safaipour
(74) *Attorney, Agent, or Firm* — Kenyon & Kenyon LLP

(57) ABSTRACT

An image playback method is provided which allows the viewer to easily recognize how much time has elapsed and to evoke, with nostalgia, the memories from the time when the image was acquired. This image playback method includes the steps of determining a time elapsed from image acquisition based on an acquisition date and time of image information obtained by the image acquisition and a current date and time; determining a fading rate based on the determined elapsed time; subjecting the image information to image processing in which the image information is faded based on the determined fading rate; and displaying the image-processed image information to play back the image.

5 Claims, 4 Drawing Sheets

IMAGE PLAYBACK METHOD, IMAGE PLAYBACK APPARATUS, AND IMAGE PLAYBACK PROGRAM

BACKGROUND OF THE INVENTION

1. Field of the Invention

The present invention relates to image playback methods, image playback apparatuses, and image playback programs.

This application is based on Japanese Patent Application No. 2006-258716, the content of which is incorporated herein by reference.

2. Description of Related Art

It is conventionally known that photographs printed on photographic paper fade to sepia over time. Even new photographs can have the visual effect of showing an aged appearance like old images if they are colorized to sepia. Some known techniques achieve such a visual effect by colorizing an image taken by a digital camera to sepia through image processing (for example, see Japanese Unexamined Patent Application, Publication Nos. 2003-134520 and 2004-336386).

BRIEF SUMMARY OF THE INVENTION

An image playback method according to a first aspect includes the steps of determining a time elapsed from image acquisition based on an acquisition date and time of image information obtained by the image acquisition and a current date and time; determining a fading rate based on the determined elapsed time; subjecting the image information to image processing in which the image information is faded based on the determined fading rate; and displaying the image-processed image information to play back the image.

An image playback apparatus according to a second aspect includes an acquisition-date/time retrieving unit configured to retrieve an acquisition date and time stored together with image information obtained by image acquisition; a current-date/time generating unit configured to generate a current date and time; an elapsed-time determining unit configured to determine an elapsed time based on the retrieved acquisition date and time and the generated current date and time; a fading-rate determining unit configured to determine a fading rate based on the determined elapsed time; an image-processing unit configured to subject the image information to fading processing based on the determined fading rate; and an image-displaying unit configured to display the image information subjected to the fading processing.

An image playback program according to a third aspect is recorded on a recording medium of a computer and instructs the computer to execute the steps of determining a time elapsed from image acquisition based on an acquisition date and time of image information obtained by the image acquisition and a current date and time; determining a fading rate based on the determined elapsed time; subjecting the image information to image processing in which the image information is faded based on the determined fading rate; and displaying the image-processed image information to play back the image.

DETAILED DESCRIPTION OF THE INVENTION

Figure 1:
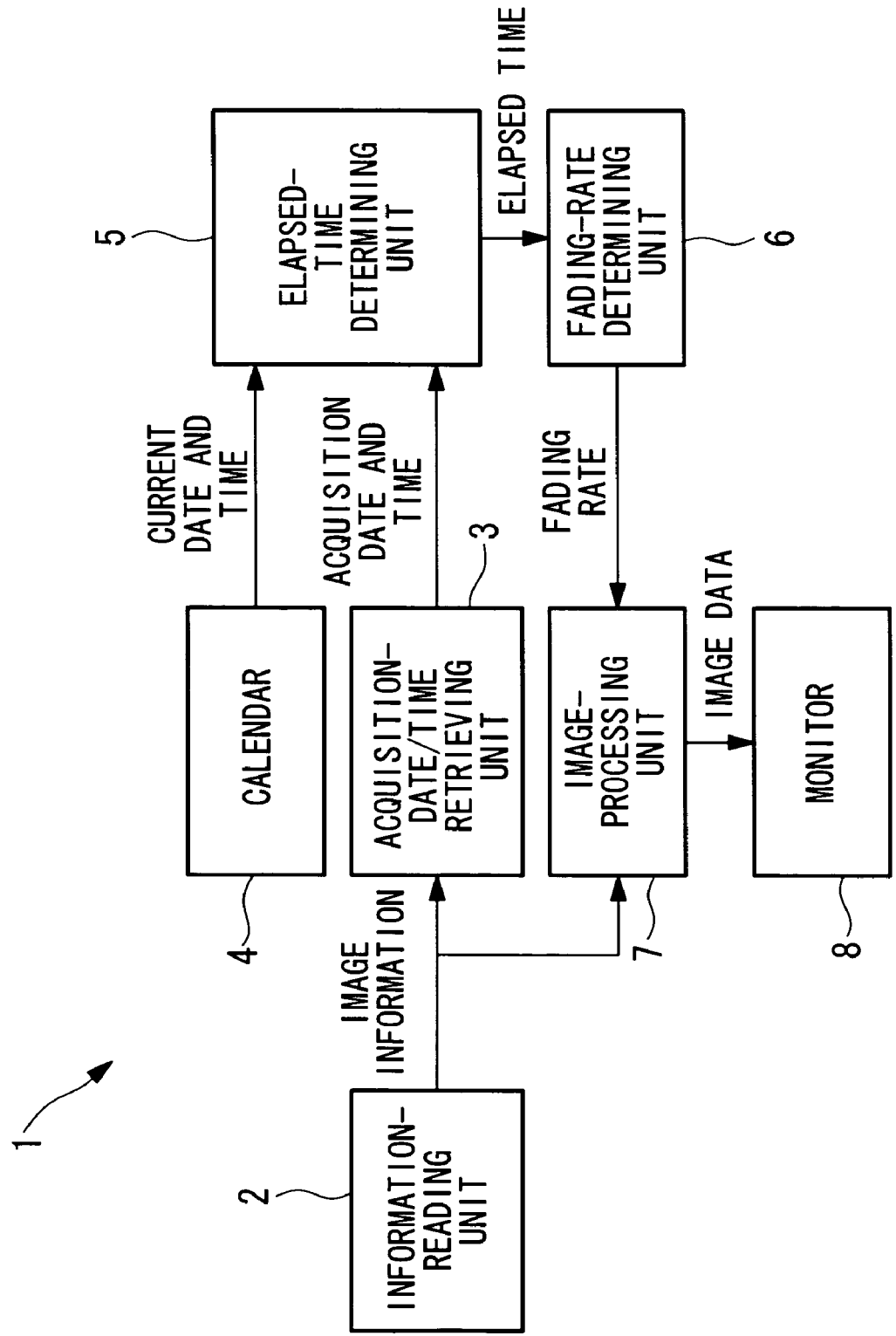
FIG. 1 is a block diagram of an image playback apparatus according to a first embodiment.

An image playback method of the present invention includes the steps of determining a time elapsed from image acquisition based on an acquisition date and time of image information obtained by the image acquisition and a current date and time; determining a fading rate based on the determined elapsed time; subjecting the image information to image processing in which the image information is faded based on the determined fading rate; and displaying the image-processed image information to play back the image.

This image playback method can be used to display an image that is image-processed at a higher fading rate as the period of time that has elapsed from the image acquisition increases. The viewer can therefore easily recognize how much time has elapsed. If the content of the image is related to the viewer, they can view the image with more nostalgia under the visual effect of the faded image, in combination with the content thereof.

It is possible that the above image playback method further includes the steps of counting a display time for which the image-processed image information is displayed and determining a restoration rate based on the counted display time, and that the image information is subjected to image processing in which the image information is faded based on the fading rate and the restoration rate in the step of subjecting the image information to the image processing in which the image information is faded.

This allows a faded displayed image to be restored to a vivid image as the viewer recollects his or her memories while they view the displayed image.

In the above image playback method, the restoration rate is preferably determined so as to increase at a higher rate than the fading rate based on the elapsed time.

This allows a vivid image to be restored in a shorter period of time than required for fading. For example, one minute of displaying can restore an image faded over ten years after image acquisition to a vivid image.

In the above image playback method, the step of subjecting the image information to the image processing in which the image information is faded may decrease the saturation or brightness of the image information.

Fading processing such as decreasing saturation or brightness can create an image matching misty memories after the passage of time.

An image playback apparatus of the present invention includes an acquisition-date/time retrieving unit configured to retrieve an acquisition date and time stored together with image information obtained by image acquisition; a current-date/time generating unit configured to generate a current date and time; an elapsed-time determining unit configured to determine an elapsed time based on the retrieved acquisition date and time and the generated current date and time; a fading-rate determining unit configured to determine a fading rate based on the determined elapsed time; an image-processing unit configured to subject the image information to fading processing based on the determined fading rate; and an image-displaying unit configured to display the image information subjected to the fading processing.

In this image playback apparatus, the acquisition date/time information retrieving unit retrieves acquisition date/time information stored together with the image information, and the elapsed-time determining unit determines the elapsed time from the current date and time and the acquisition date and time. The fading-rate determining unit determines the fading rate based on the elapsed time, and the image-processing unit creates an image with a degree of fading that becomes higher as the elapsed time increases. The image thus created is displayed by the image-displaying unit. The viewer can therefore easily recognize how much time has elapsed. If the content of the image is related to the viewer, they can view the image with more nostalgia under the visual effect of the faded image, in combination with the content thereof.

It is possible that the above image playback apparatus further includes a display-time counting unit configured to count a display time and that the fading-rate determining unit determines the fading rate based on the elapsed time and the display time.

In this case, the fading-rate determining unit can decrease the degree of fading of the image based on the display time counted by the display-time counting unit to display a vivid image. The image playback apparatus can therefore restore the faded image to a vivid image as the viewer recollects his or her memories as the display time elapses.

An image playback program of the present invention is recorded on a recording medium of a computer and instructs the computer to execute the steps of determining a time elapsed from image acquisition based on an acquisition date and time of image information obtained by the image acquisition and a current date and time; determining a fading rate based on the determined elapsed time; subjecting the image information to image processing in which the image information is faded based on the determined fading rate; and displaying the image-processed image information to play back the image.

The image playback method, the image playback apparatus, and the image playback program described above advantageously allow the viewer to easily recognize how much time has elapsed and to evoke, with more nostalgia, the memories from the time when the image was acquired if the content of the image is related to the viewer.

An image playback apparatus 1 and an image playback method according to a first embodiment will now be described with reference to FIGS. 1 and 2.

In FIG. 1, the image playback apparatus 1 includes an information-reading unit 2 configured to read image information acquired by an image-acquisition apparatus such as a digital camera and stored on a recording medium such as a memory of a digital camera or a hard disk; an acquisition-date/time retrieving unit 3 configured to retrieve acquisition date/time data from the read image information; a calendar (current-date/time generating unit) 4 configured to generate current date/time data; an elapsed-time determining unit 5 configured to determine an elapsed time based on the acquisition date/time data and the current date/time data; a fading-rate determining unit 6 configured to determine a fading rate based on the determined elapsed time; an image-processing unit 7 configured to subject the image data to fading processing based on the fading rate determined by the fading-rate determining unit 6; and a monitor (display unit) 8 configured to display the processed image data.

An example of the acquisition date/time data contained in the image information is metadata indicating the acquisition date and time of the image data. If the metadata is updated each time the image data is edited, the unupdated acquisition date/time data must be maintained in the metadata separately from the edited date/time data.

The elapsed-time determining unit 5 determines the elapsed time by subtracting the acquisition date/time data, which is a value indicating the acquisition date and time, from the current date/time data, which is a value indicating the current date and time.

The fading-rate determining unit 6 determines the fading rate by substituting the elapsed time into a predetermined function. The function may be one in which fading proceeds in proportion to the elapsed time. Alternatively, the function may be one that reaches saturation, such that fading does not proceed after a predetermined period of elapsed time. The fading rate is not determined so that the image data acquired turns rapidly to sepia, but is determined so that the data turns to sepia over a period of time, for example, about ten years.

The fading processing of the image data by the image-processing unit 7 is, for example, image processing in which the hue of the image data is set to a predetermined sepia hue (reddish brown), as disclosed in Japanese Unexamined Patent Application, Publication No. 2003-134520. In this case, the fading rate determined by the fading-rate determining unit 6 is used to determine the value of a color difference signal.

Figure 2:
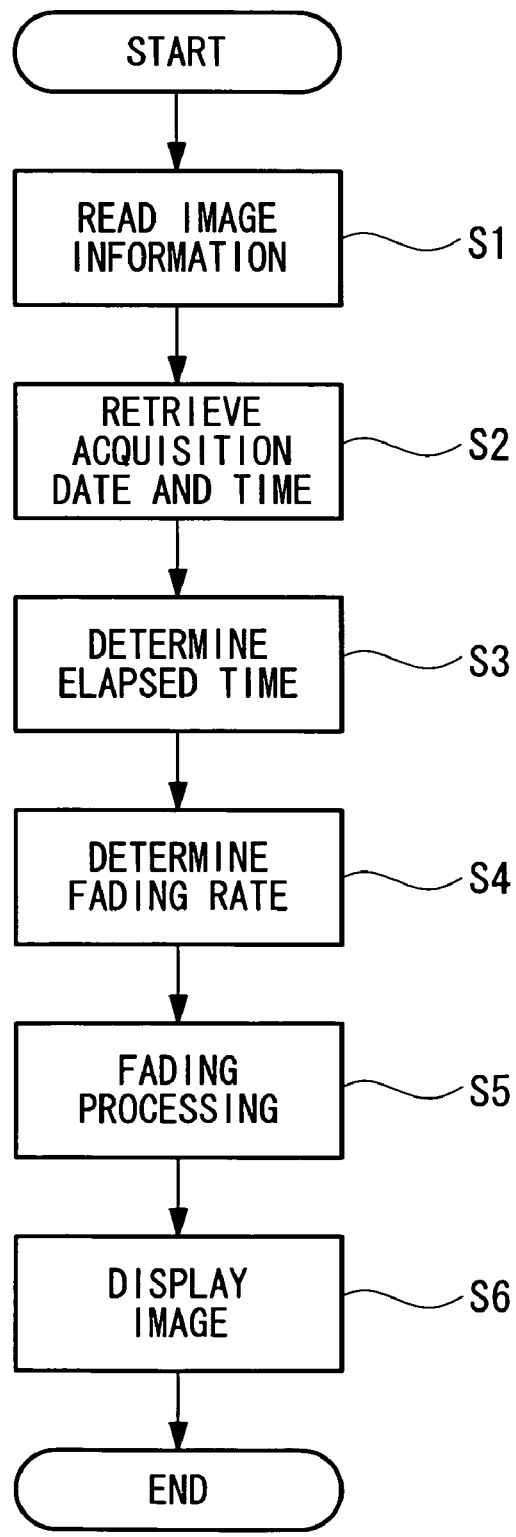
FIG. 2 is a flowchart illustrating an image playback method using the image playback apparatus of FIG. 1.

FIG. 2 illustrates the playback of the image data acquired and stored on the recording medium by the image playback method using the image playback apparatus 1 having the structure described above. The information-reading unit 2 reads the image information from the recording medium (Step S1). The acquisition-date/time retrieving unit 3 retrieves the acquisition date and time from the read image information (Step S2).

The elapsed-time determining unit 5 then calculates the difference between the acquisition date and time and the current date and time, generated by the calendar 4, to determine the elapsed time (Step S3). The fading-rate determining unit 6 determines the fading rate based on the elapsed time (Step S4). The image-processing unit 7 subjects the image data to the fading processing based on the determined fading rate (Step S5). The monitor 8 thus displays an image with a fading rate and degree of sepia that become higher as the period of time that has elapsed from the acquisition date and time to the time of playback increases (Step S6).

Accordingly, an image with a high degree of sepia is displayed if an extended period of time has elapsed from the acquisition date and time. The viewer can therefore easily realize that an extended period of time has elapsed from the acquisition date. If the content of the image data is related to the viewer, they can view the image with more nostalgia under the visual effect of the faded image, in combination with the content thereof.

In this embodiment, as described above, the fading processing by the image-processing unit 7 is processing in which the hue of the image data is set to sepia. The processing is not limited thereto, however, and image processing in which the image data is colorized to black and white may be employed.

In this embodiment, the time elapsed from the acquisition date and time also increases at display time. It is difficult, however, to visually check the degree of change to the fading during display because the fading rate is gradually changed over an extended period of time. Hence, the passage of time at display time can be ignored, and the display may be continued without any change in the fading rate that has been determined when display started.

Figure 3:
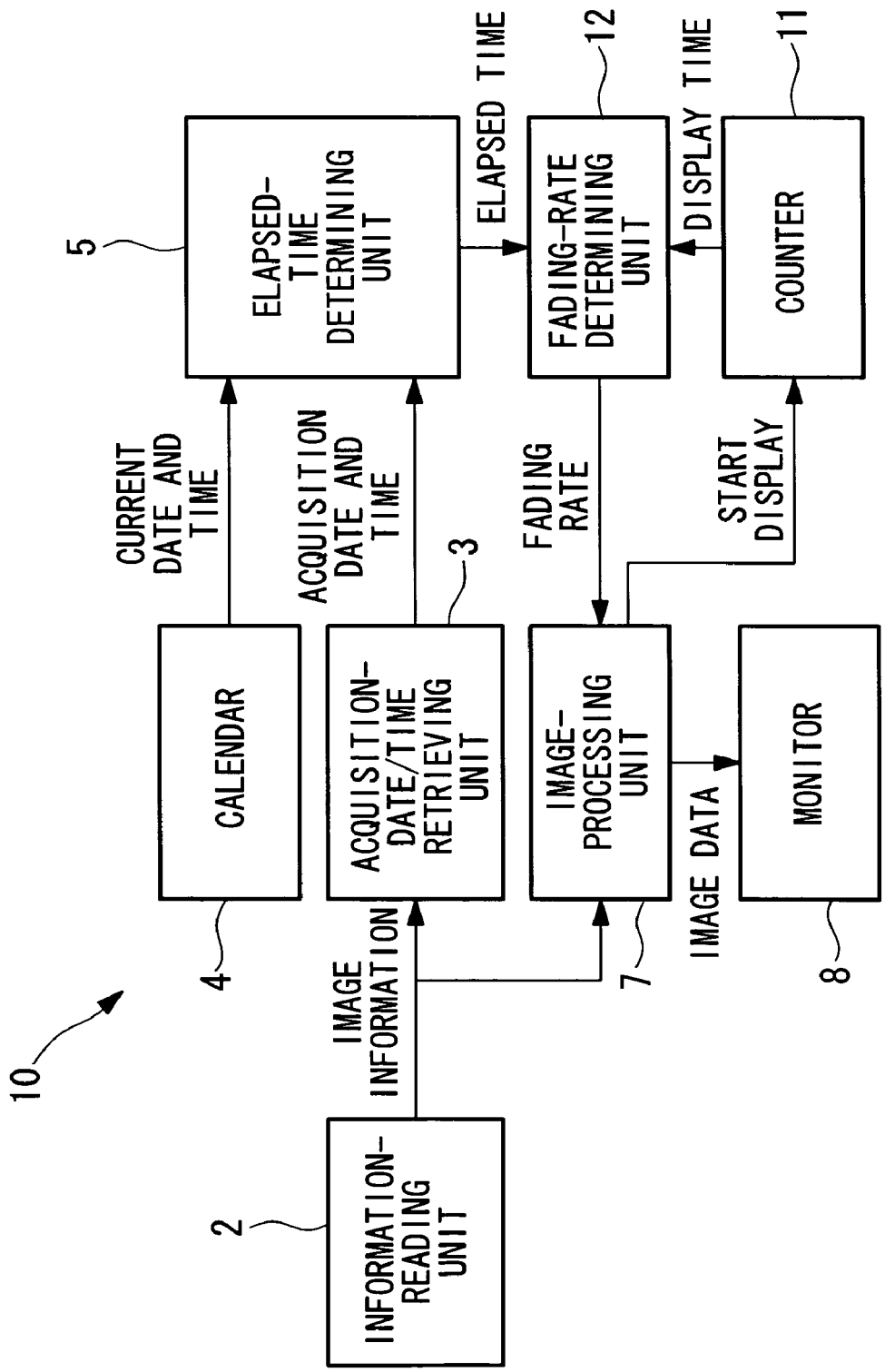
FIG. 3 is a block diagram of an image playback apparatus according to a second embodiment.
Figure 4:
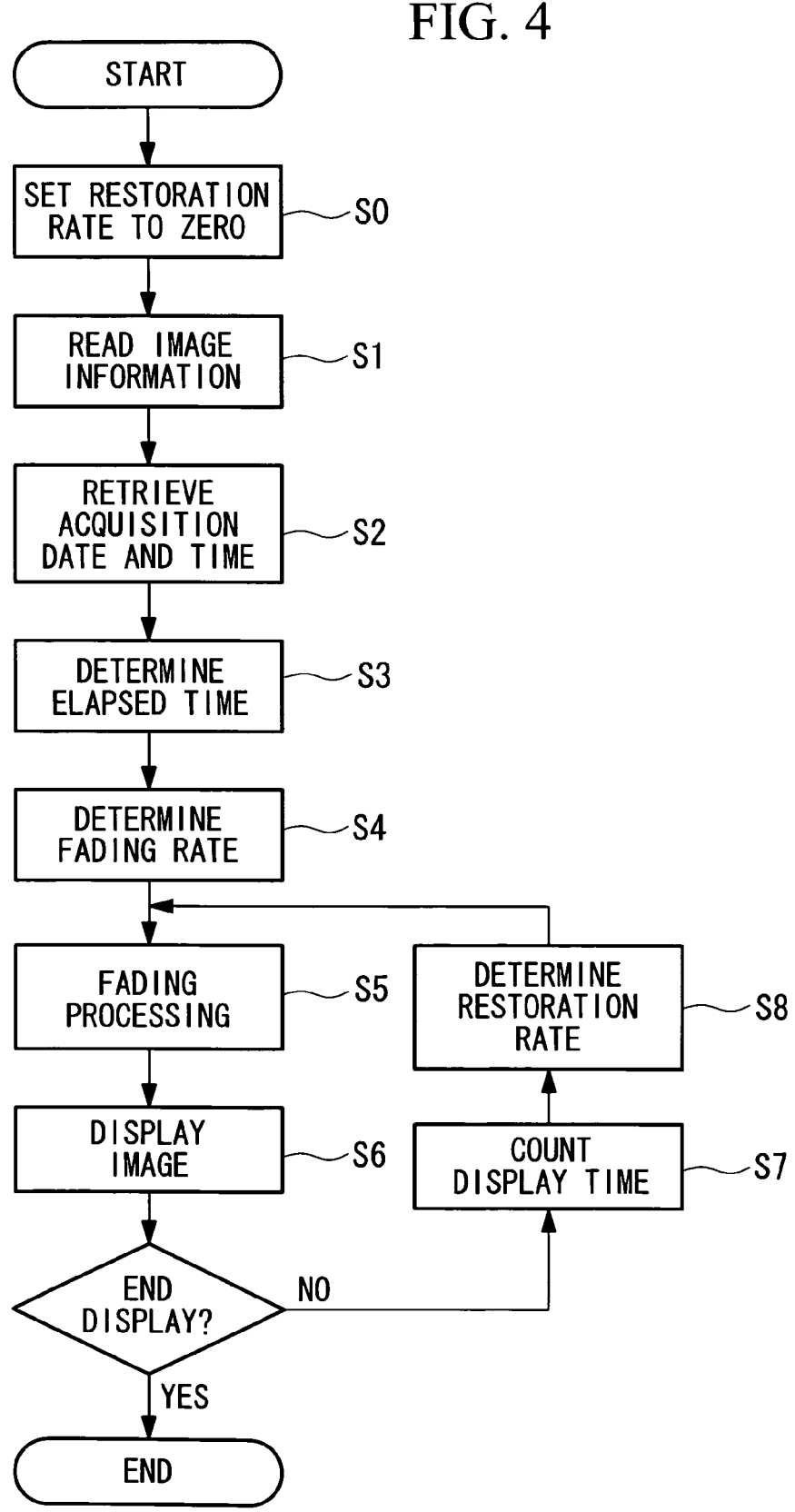
FIG. 4 is a flowchart illustrating an image playback method using the image playback apparatus of FIG. 3.

Next, an image playback apparatus 10 and an image playback method according to a second embodiment will be described with reference to FIGS. 3 and 4.

In the description of this embodiment, the same components as used in the image playback apparatus 1 and the image playback method according to the first embodiment described above are designated by the same numerals and will not be described.

The image playback apparatus 10 differs from the image playback apparatus 1 according to the first embodiment in that it includes a counter (display-time counting unit) 11' configured to count the time for which the monitor 8 displays image data, and in that a fading-rate determining unit calculates the fading rate based on the display time counted by the counter 11.

That is, in the image playback apparatus 10, a fading-rate determining unit 12 subtracts a restoration rate determined based on the display time from the fading rate, which is determined based on the elapsed time, as in the first embodiment, by the fading-rate determining unit 6.

The restoration rate is set so that it increases in a sufficiently shorter period of time than the fading rate. While the fading rate reaches 100% over ten years, for example, the restoration rate is set so that it reaches 100% in one minute. In this case, one minute of displaying will restore image data faded to 100% over ten years to its original vivid image data before the fading processing.

In the image playback method using the image playback apparatus 10 having the structure described above, first, the restoration rate is set to zero (Step S0). The information-reading unit reads image information acquired and stored on a recording medium (Step S1). The acquisition-date/time retrieving unit retrieves the acquisition date and time (Step S2). The elapsed-time determining unit 5 then calculates the difference between the acquisition date and time and the current date and time, generated by the calendar 4, to determine the elapsed time (Step S3).

The fading-rate determining unit 12 determines the fading rate based on the elapsed time (Step S4). The image-processing unit 7 subjects the image data to fading processing based on the determined fading rate and the set restoration rate (Step S5). Because the restoration rate has been set to zero at the start of playback, the monitor 8 displays an image with a fading rate and degree of sepia that become higher as the period of time that has elapsed from the acquisition date and time to the time of playback increases (Step S6).

In this embodiment, additionally, the counter 11 counts the display time for which the monitor 8 displays the image data (Step S7). The fading-rate determining unit 12 determines the restoration rate based on the counted display time (Step S8). The image-processing unit 7 subjects the image data to the fading processing based on the fading rate and the restoration rate (Step S5), and the monitor 8 displays the image data (Step S6). Subsequently, Steps S5 to S8 are repeated until the image playback apparatus 10 is instructed to end the display.

The degree of fading of the image data displayed on the monitor 8 decreases with the passage of the display time because the change in the fading rate determined based on the elapsed time is sufficiently smaller than the change in the restoration rate determined in proportion to the display time.

In other words, at the start of playback, the monitor 8 displays an image with a high fading rate and a high degree of sepia if an extended period of time has elapsed from the acquisition of the image, because the fading rate corresponds to the time elapsed from the acquisition. The viewer can therefore easily realize that an extended period of time has elapsed from the acquisition date. If the content of the image data is related to the viewer, they can view the image with more nostalgia under the visual effect of the faded image, in combination with the content thereof.

Furthermore, the image playback apparatus 10 and the image playback method, as mentioned above, gradually restore the sepia image displayed on the monitor 8 to its original vivid image as the display time increases. That is, the displayed image is gradually restored to a vivid color image as if the process follows gradual restoration of misty memories. This provides the visual effect of gradually evoking and fixing the memories for the acquisition date, rather than suddenly tracing the memories back to the acquisition date.

In this embodiment, image data faded to sepia with the degree of fading corresponding to the time elapsed from the acquisition date and time is displayed and gradually restored to its original vivid color image based on the display time for each playback operation. Alternatively, the display time may be added up and stored for the next playback operation so that the playback of the image data can be started with a restoration rate based on the display time.

The image playback methods according to the above embodiments can also be realized using an image playback program that instructs a computer to execute Steps S0 to S8 (or Steps S1 to S6). That is, the computer may be instructed to execute the individual steps, including the steps of reading image information from a recording medium, retrieving the acquisition date and time from the read image information, calculating the difference between the acquisition date and time and the current date and time to determine the elapsed time, determining the fading rate based on the elapsed time, subjecting the image data to the fading processing based on the determined fading rate by the image-processing unit, and displaying the image data on the monitor.

What is claimed is:

1. An image playback method comprising the steps of:
   determining a time elapsed from image acquisition based on an acquisition date and time of image information obtained by the image acquisition and a current date and time;
   determining a fading rate based on the determined elapsed time;
   subjecting the image information to image processing in which the image information is faded based on the determined fading rate;
   displaying the image-processed image information to play back the image;
   counting a display time for which the image-processed image information is displayed; and
   determining a restoration rate based on the counted display time;
   wherein the image information is subjected to image processing in which the image information is faded based on the fading rate and the restoration rate in the step of subjecting the image information to the image processing in which the image information is faded.

2. The image playback method according to claim 1, wherein the restoration rate is determined so as to increase at a higher rate than the fading rate based on the elapsed time.

3. The image playback method according to claim 1, wherein the step of subjecting the image information to the image processing in which the image information is faded decreases the saturation or brightness of the image information.

4. An image playback apparatus comprising:
   an acquisition-date/time retrieving unit configured to retrieve an acquisition date and time stored together with image information obtained by image acquisition;
   a current-date/time generating unit configured to generate a current date and time;
   an elapsed-time determining unit configured to determine an elapsed time based on the retrieved acquisition date and time and the generated current date and time;
   a fading-rate determining unit configured to determine a fading rate based on the determined elapsed time;

an image-processing unit configured to subject the image information to fading processing based on the determined fading rate;
an image-displaying unit configured to display the image information subjected to the fading processing; and
a display-time counting unit configured to count a display time, wherein the fading-rate determining unit determines the fading rate based on the elapsed time and the display time.

5. A non-transitory computer-readable medium having stored thereon an image playback program, the program instructing a computer to execute the steps of:
determining a time elapsed from image acquisition based on an acquisition date and time of image information obtained by the image acquisition and a current date and time;
determining a fading rate based on the determined elapsed time;
subjecting the image information to image processing in which the image information is faded based on the determined fading rate;
displaying the image-processed image information to play back the image; and
counting a display time, wherein the fading rate is determined based on the elapsed time and the display time.

* * * * *